United States Patent [19]

Kleczkowski et al.

[11] 4,250,529
[45] Feb. 10, 1981

[54] METHOD AND APPARATUS FOR OPENING DISK PACKS

[75] Inventors: Stawomir P. Kleczkowski, Boulder, Colo.; Rupert F. Ross, Tucson, Ariz.

[73] Assignee: International Business Machines Corporation, Armonk, N.Y.

[21] Appl. No.: 64,675

[22] Filed: Aug. 8, 1979

[51] Int. Cl.³ .................... G11B 5/012; G11B 5/016; G11B 17/02
[52] U.S. Cl. ......................................... 360/98; 360/99
[58] Field of Search ................................... 360/98, 99

[56] References Cited

U.S. PATENT DOCUMENTS

| | | | |
|---|---|---|---|
| 3,994,017 | 11/1976 | Barkhuff et al. | 360/98 |
| 4,152,739 | 5/1979 | DeMoss et al. | 360/98 |

*Primary Examiner*—Robert S. Tupper
*Attorney, Agent, or Firm*—Herbert F. Somermeyer

[57] ABSTRACT

Method and apparatus for opening stacked disk memory members arranged in a pack for co-rotation and having substantial freedom of axial movement relative to one another, the opening being accomplished by engaging the disk pack with drive means having axially extending pins of varying length, and of a predetermined pattern with the increments of pin length variation being substantially equal to the desired openings between the disk members, and the disk memory members having openings defined therein with corresponding patterns adjacent disk memory members having progressively fewer openings to receive pins of a predetermined pattern with the result that all pins of a predetermined length bear upon a disk memory member and axially separate it from the adjacent disk memory member, thereby providing an opening at the termini of each set of pins of common length.

6 Claims, 5 Drawing Figures

METHOD AND APPARATUS FOR OPENING DISK PACKS

The present invention relates generally to memory storage apparatus for data processing apparatus, such as computers, and more particularly to drive and opening means for a plurality of co-rotating, axially aligned disk memory members arranged in a pack configuration.

BACKGROUND OF THE INVENTION

Storage of data and information, particularly upon magnetic media, is conveniently accomplished by recording such information on storage disks which are commonly configured in the form of openable packs. Physical storage of such disk packs is conveniently and efficiently accomplished by closing the pack with the disks closely confined. However, to utilize such stored information, it is required that the disk pack be opened at least at one position and that the selected information be accessed by a transducer head brought into close relationship with the selected disk. This method of information storage and retrieval is well known in the art. A number of devices have been proposed for accessing data stored on such disk packs. Almost universally, such suggestions involve defining a single opening in the stack between selected disks, and moving a transducer into the opening for information retrieval. Either the single transducer must index axially to the opening, or the pack itself is moved relative to the transducer head to permit access of the transducer head to the opening at the selected disk.

Devices to accomplish the desired opening of the disk pack involve relatively complicated and expensive expedients. Examples of such devices are to be found for instance, in U.S. Pat. Nos. 2,960,340, 3,229,269, 3,3130,393, 4,011,591 and 4,019,204.

As will be apparent from an examination of the teachings of the above specified U.S. Letters Patents both involved physical, and pnuematic means, are employed with accompanying mechanical complications, expense, and risk of failure.

SUMMARY OF THE INVENTION

The present invention, which provides a heretofore unavailable improvement over previous concepts for accessing information stored in disk packs, comprises a simple arrangement in which a plurality of pins, or sets of pins, are provided in conjunction with drive means, such as a drive spindle, to engage and concurrently separate a plurality of disks maintained in a disk pack. The pins differ in length, in a preferable embodiment, by constant increments and the memory disk members each include complementary openings to permit certain of the pins to pass therethrough, with a selected set of pins supporting an individual disk and separating it from the adjacent disks. Thus, with a minimum of complexity and dynamic interaction of the apparatus, the disk pack is opened. Either a single indexing transducer head, or a plurality of transducer heads may be employed to access the desired information by moving between the separated disks.

It is therefore an object of the present invention to provide an improved disk pack opening apparatus and method.

It is another object of the present invention to provide improved disk accessing apparatus and method for concurrently opening all disk memory members of a stack of such disks.

It is still another object of the present invention to provide improved disk accessing apparatus and method in which a plurality of transducers may be employed to rapidly read the information contained in a stack of disks.

These and other advantages of the present invention will become apparent from the drawings and following description.

DESCRIPTION OF THE PREFERRED EMBODIMENT

Figure 1:
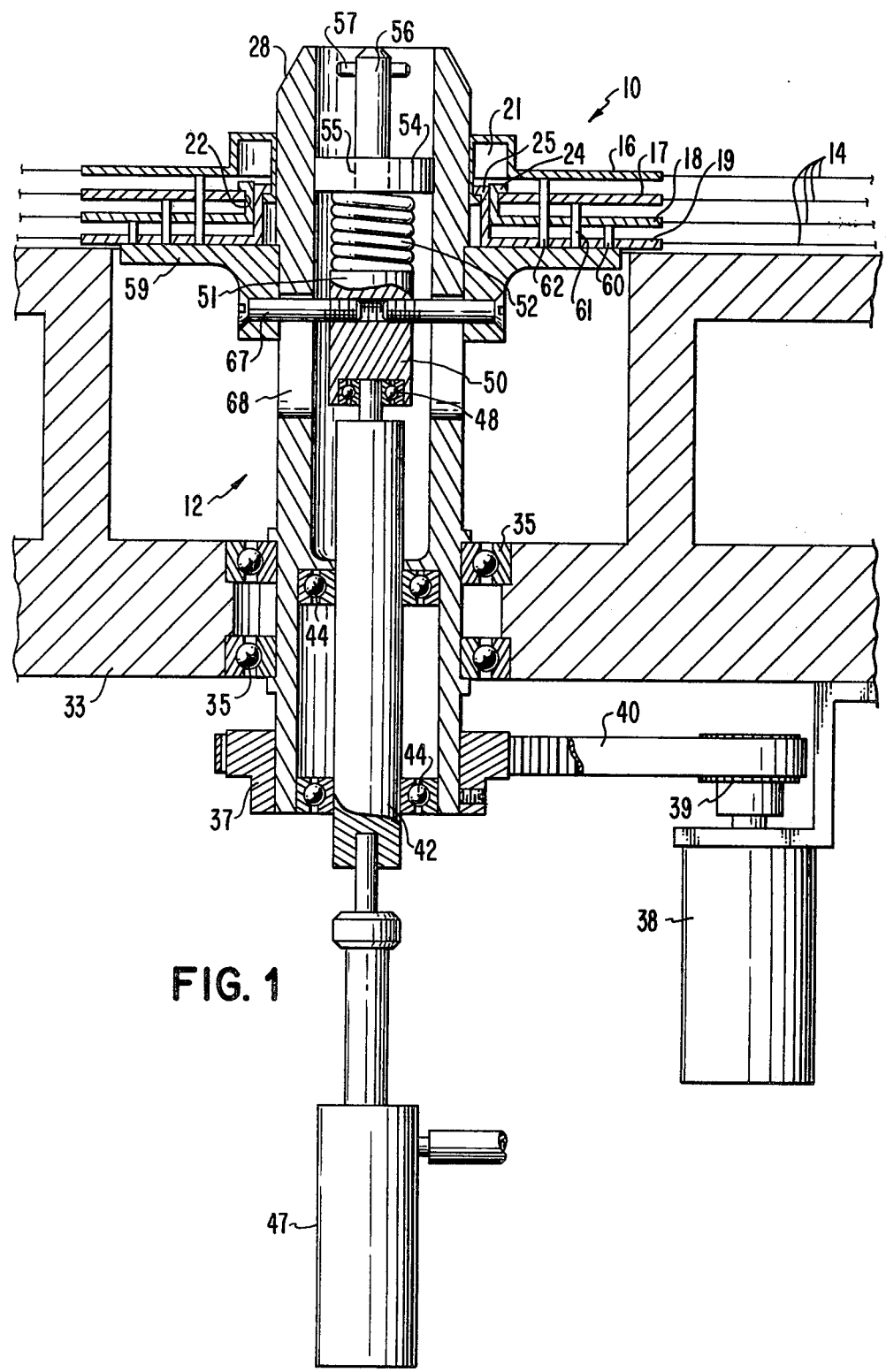
FIG. 1 is a simplified side view in section of a drive means and disk pack in accord with the present invention.

Turning now to the drawings, where like components are designated by like numerals throughout the figures, a disk storage pack 10 and drive mechanism 12 are illustrated in FIG. 1. As illustrated, disk storage pack 10 and drive mechanism 12 constitute preferred embodiments of the invention with reference to known devices for accomplishing similar ends, but it is to be understood that other configurations and embodiments of the invention may be preferred if different compromises between cost, complexity and reliability are elected.

As illustrated, disk storage pack 10 is comprised of a plurality of essentially identical, flexible disk members 14 which are supported by upper center member 16, upper intermediate center member 17, lower intermediate center member 18, and lower center member 19. Though the discussion following will pertain to flexible disk members, preferably having a thickness on the order of 0.005 inches to 0.0010 inch, it is to be understood that a rigid disk could be substituted for flexible disk 14 if desired. Also, while it is contemplated that though flexible disk 14 is of conventional magnetic media manufactured, various other methods of information storage would be equally applicable.

Figure 2:
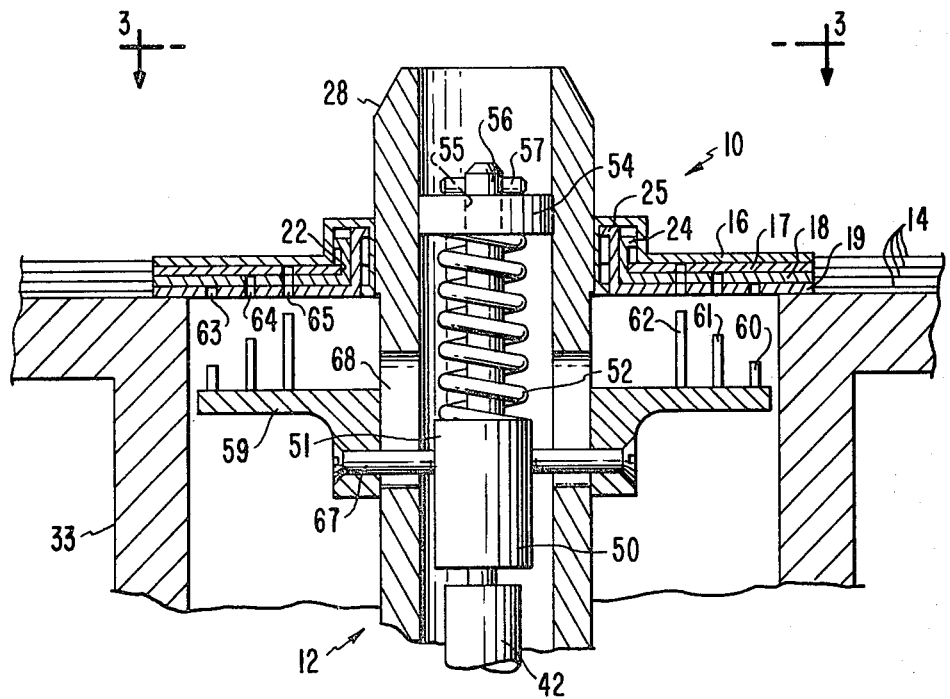
FIG. 2 is a sectioned view of a limited portion of the drive means and disk pack of FIG. 1 illustrating the pins in the retracted position.
Figure 3:
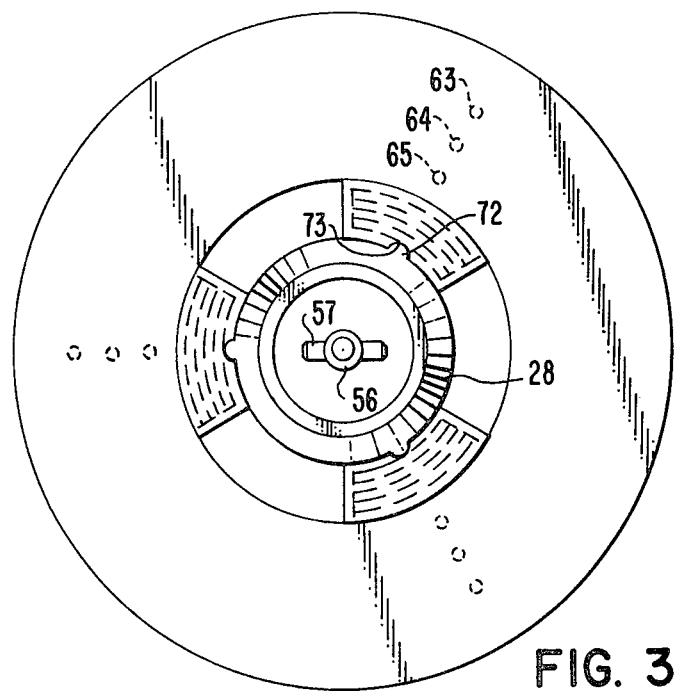
FIG. 3 is a top view along line 3—3 of a limited portion of the device illustrated in FIG. 2.

As will be noted from FIGS. 1 and 3, upper center member 16 has defined therein an voids 21. Upper intermediate center support 17 includes openings 22 through which end portions 24 and 25 of lower intermediate center support 18 and lower center support 19 extend. This arrangement permits center members 16, 17, 18 and 19 to move axially relative to one another for a storable, telescoped configuration, as shown in FIG. 2, or an opened, operable configuration illustrated in FIG. 1.

Spindle 28 engages center members 16, 17, 18 and 19 to permit axial movement of such center members 16, 17, 18 and 19, but, as will be described below, with means to secure storage disk 10 for rotating with spindle 28. Spindle 28 is journaled for rotational movement relative to fixed support member 33 by bearings 35. Pulley 37, positioned at the lower, outer surface of spindle 28 is connected to motor 38, at pulley 39 carried on motor 38 by belt 40. Motor 38 is in turn attached to support member 33. Thus it will be seen that motor 38 serves to rotate spindle 28, and disk pack, 10, attached thereto.

Actuator shaft 42, carried in the hollow interior of spindle 28, is journaled for rotation relative to spindle 28 by bearings 44. Thus, as spindle 28 rotates, actuator shaft 42 may be maintained stationary.

Bearing 48 permits collar support member 50, to rotate with spindle 28. Shoulder 51, defined on collar member 50, carries spring 52 with spring 52 being secured at the opposite end by stop 54 attached to spindle 28. Shaft 56 of collar support member 50 extends through stop 54 at guide opening 55, and pilots spring 52 between shoulder 51 and stop 54. Motion limit cross pin 57 determines the axial movement limit in the retraction mode of the assembly including actuator shaft 42, collar support member 50 and linear movement means 47 as will be readily apparent in FIG. 2. Spindle collar 59 carries first pin set 60, second pin set 61 and third pin set 62, which in turn cooperate with complementary first openings 63, second openings 64 and third openings 65, defined in lower center support 19, lower intermediate center support and lower center support 18 and 14 and upper intermediate center support, lower intermediate center support, and lower center support 17, 18 and 19, as illustrated. S pindle collar 59 is attached to collar support member 50 by bolts 67 which extend through slots 68 defined in spindle 28. Thus spindle collar 59 moves in conjunction with actuator shaft 42 and collar support member 50 as bolts 67 moves in slots 68.

The relationship of storage disk pack 10 relative to spindle 28 will be more readily apparent from FIG. 3. As shown, spindle keys 72 are defined on the outer portion of spindle 28 and engage disk pack keyway 73 in upper center support 16 of disk pack 10.

Figure 4:
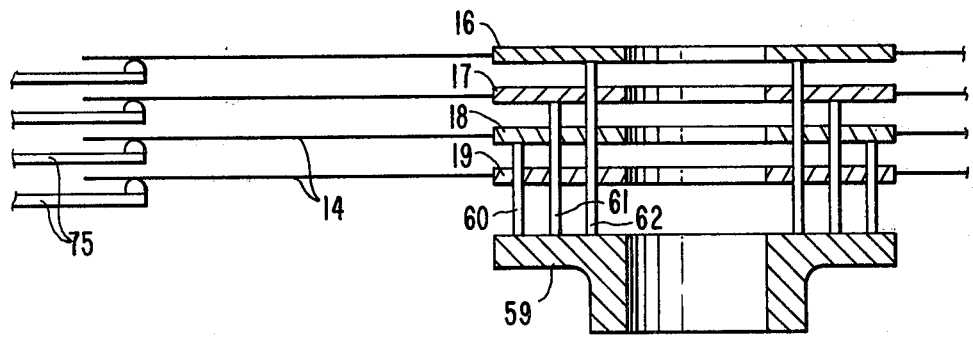
FIG. 4 is a simplified, partial view of a separated disk pack in accord with the instant invention.
Figure 5:
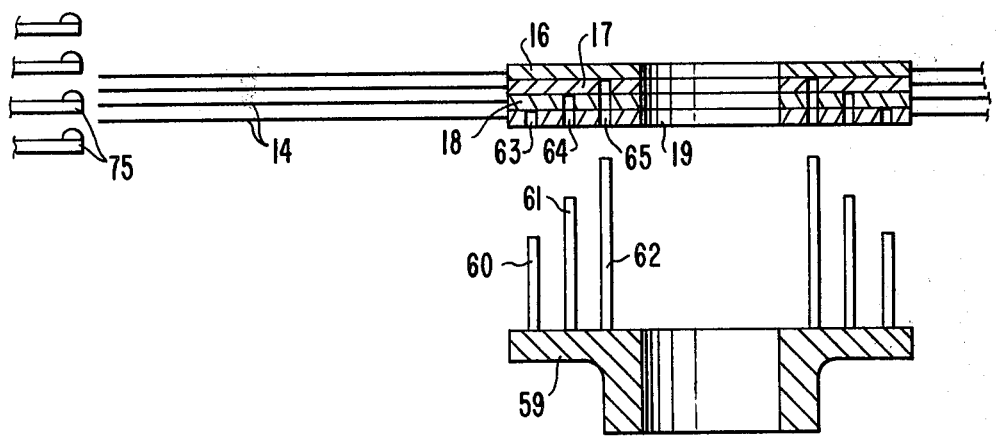
FIG. 5 is a view similar to FIG. 4 illustrating the disk pack configured for physical storage.

The advantages of storage disk pack 10 and drive mechanism 12 are apparent from the simplified illustration of FIGS. 4 and 5 when considered in conjunction with FIGS. 1 and 2. As illustrated in FIG. 4, storage disk pack 10 is in an opened configuration with flexible disks 14 separated to admit a plurality of transducer heads 75. This corresponds to the configuration of FIG. 1, i.e. with spindle collar 59 in an extended position as a result of extension of linear movement mechanism 47. As shown, pin set 60 passes through corresponding first openings 63 in lower center support 19, but engages and spaces lower intermediate center support 18. Pin set 61 passes through corresponding openings 64 defined through center supports 18 and 19, but engages in spaces upper intermediate center support 17. Finally, pin set 62 passes through third opening 65 defined through center supports 17, 18 and 19 but engages in spaces upper center support 16. In this manner, flexible disks 14 are opened and spaced one from the other, to, as illustrated, permit access of a plurality of transducer heads 75 to retrieve information from flexible disks 14.

On the other hand, disk pack 10, as illustrated in a simplified manner in FIG. 5, may be compactly stored by, with reference to FIG. 1, retracting linear movement means 47 thereby configuring spindle collar 59 as illustrated in FIG. 2, i.e. with inset 60, 61 and 62 retracted from corresponding first openings 63, second openings 64, and third openings 65. Transducer heads 75 are of course withdrawn to permit removal and closing of flexible disks 14.

Thus, in summary, the present invention provides for efficient and compact physical storage of storage disk pack when removed from the drive mechanism. However, by merely placing the storage disk pack on the spindle of the drive mechanism, as described in detail above, pins of varying lengths selectively engage and space the center supports for flexible disks, thereby providing for, as desired, concurrent or sequential accessing of the openings by one or more transducer head, i.e. with a plurality of transducer heads as illustrated at FIGS. 4 and 5, or with a single head indexing through the appropriate opening.

While the invention is described above with reference to the preferred embodiment as being operable with flexible disks, i.e. of relatively thin storage media, thicker storage media may be employed thus providing similar advantages with more rigid disks. Also, while the invention preferably employs a plurality of pins, and most preferably three pins defining a plane at the termini thereof, it is of course possible to engage the disk members with a single pin and utilize other structures i.e. spines on the spindle, to facilitate axial movement. Though the pins are illustrated as being radially spaced one from another to define the pin sets, it is of course feasible to utilize other patterns such as angular spacing at a constant radius for the various openings and corresponding pins. In the simplest form, the drive spindle and pins may be of a fixed configuration and the disk pack opened and closed by placing the disk pack on the drive spindle and removing it from the drive spindle. Thus, although but one preferred embodiment of the present invention has been illustrated and described, it is anticipated that numerous other changes and modifications will be apparent to those skilled in the art, and that such changes may be made without departing from the invention, as defined by the following claims.

We claim:

1. Apparatus for opening and accessing a disk memory member pack in a plurality of concurrent access openings comprising: a plurality of disk memory members adapted for rotation around a common axis and for reciprocating axial movements; drive means mounted for rotation and adapted to engage the disk memory members for co-rotation, the drive means including a plurality of axially extending pins of varying lengths and arranged by length into sets of pins with each set of pins having pins spaced circumferentially apart; pin mount means in said drive means to axially movably mount said axially extending pins for co-rotation with said drive means, actuator means in said drive means and co-rotatable with said axially extending pins and operatively connected to said pins to axially urge all pins in one set of pins to move in a first axial direction for selecting a disk memory member for accessing by axially pushing same to create an enlarged access opening between the pushed disk and an adjacent disk while said drive means is rotating; and at least two of said disk memory members having a plurality of sets of openings, said opening sets being arranged in configurations corresponding to the predetermined configurations of the sets of pins with adjacent disk members having a set of openings thereon to admit a set of pins through only one of the adjacent disk memory members, whereby the disk memory members may be axially separated by axially moving the pin sets in said first axial direction through the corresponding sets of openings therein and axially engaging the individual disk memory members not having corresponding openings with the terminal portions of the pin sets.

2. Apparatus for opening and accessing disk memory members as set forth in claim 1 having multiple transducer heads positioned to move into the openings between the disk memory members induced by the pin sets and means mounting said heads for movement into said openings, respectively.

3. Apparatus for opening and accessing disk memory members as set forth in claim 1 in which the sets of pins vary in length by a whole number multiple of a common increment.

4. Apparatus for opening and accessing disk memory members as set forth in claim 1 in which each set of pins comprises three pins of a common length.

5. Apparatus for opening and accessing disk memory members as set forth in claim 1 in which the drive means comprise a spindle adapted to receive and rotate the disk memory members, said pin mount means including a collar member disposed coaxial to said spindle for carrying the pin sets and mounted on said spindle for axial movements relative to the spindle, and said actuator means axially moving the collar member relative to the spindle whereby said axially extending pins are axially moved.

6. A method for providing a preselected number of axial openings greater than one between a plurality of disk memory members adapted for co-rotation around a common axis and free to move axially relative to one another, the method comprising the steps of:

during rotation of said disk memory members inserting a plurality of pin sets of varying lengths with each pin set of a common length being in a predetermined orientation into a plurality of openings defined in a disk memory member pack; during rotation of said disk memory members, opening initial adjacent disk memory members by passing at least one pin set of a predetermined length through corresponding openings defined in one of the disk memory members and engaging the other disk memory member at the ends of each pin of said common length; and during rotation of said disk members, successively opening adjacent disk memory members by spacing the disk memory members at the ends of the other pin sets of common lengths whereby a plurality of transducer access openings in a pack of disk memory members may be accomplished at operating rotational speed by carrying the disk memory members on a drive means containing the pin sets all for co-rotation therewith.

* * * * *